No. 754,597. PATENTED MAR. 15, 1904.
W. NESBITT.
CASING TURNER.
APPLICATION FILED APR. 20, 1903.
NO MODEL. 2 SHEETS—SHEET 2.
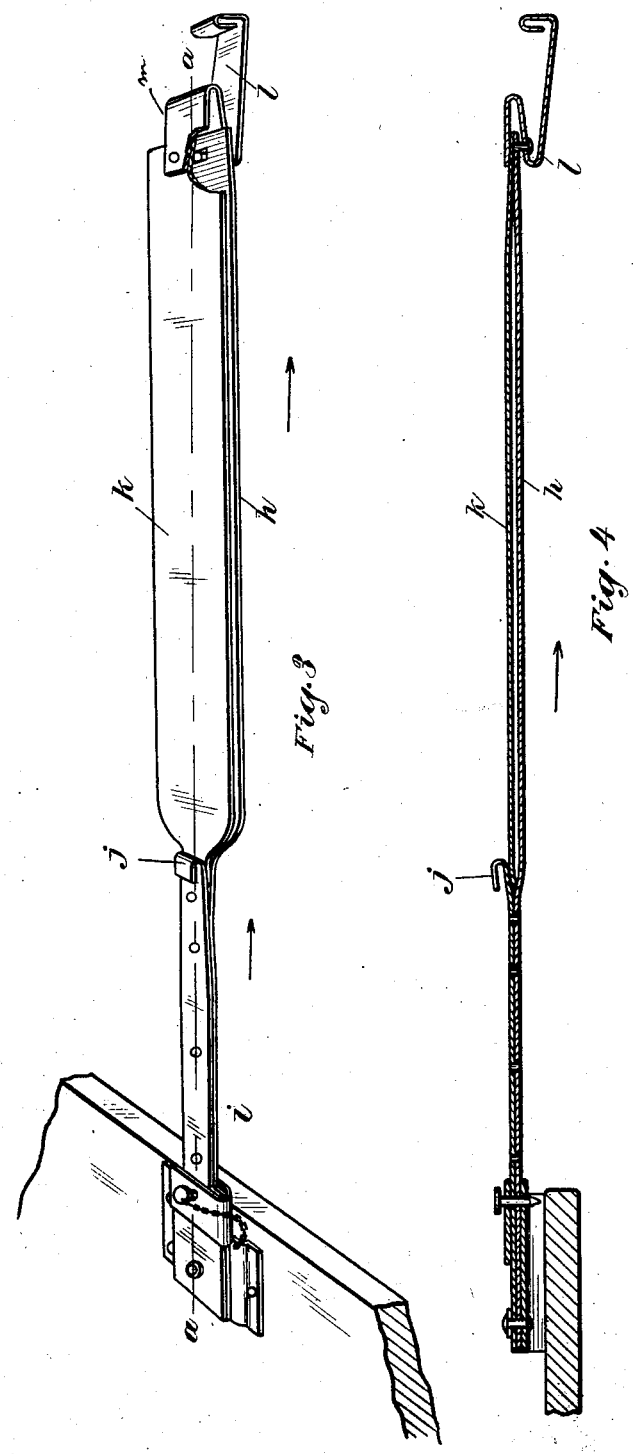

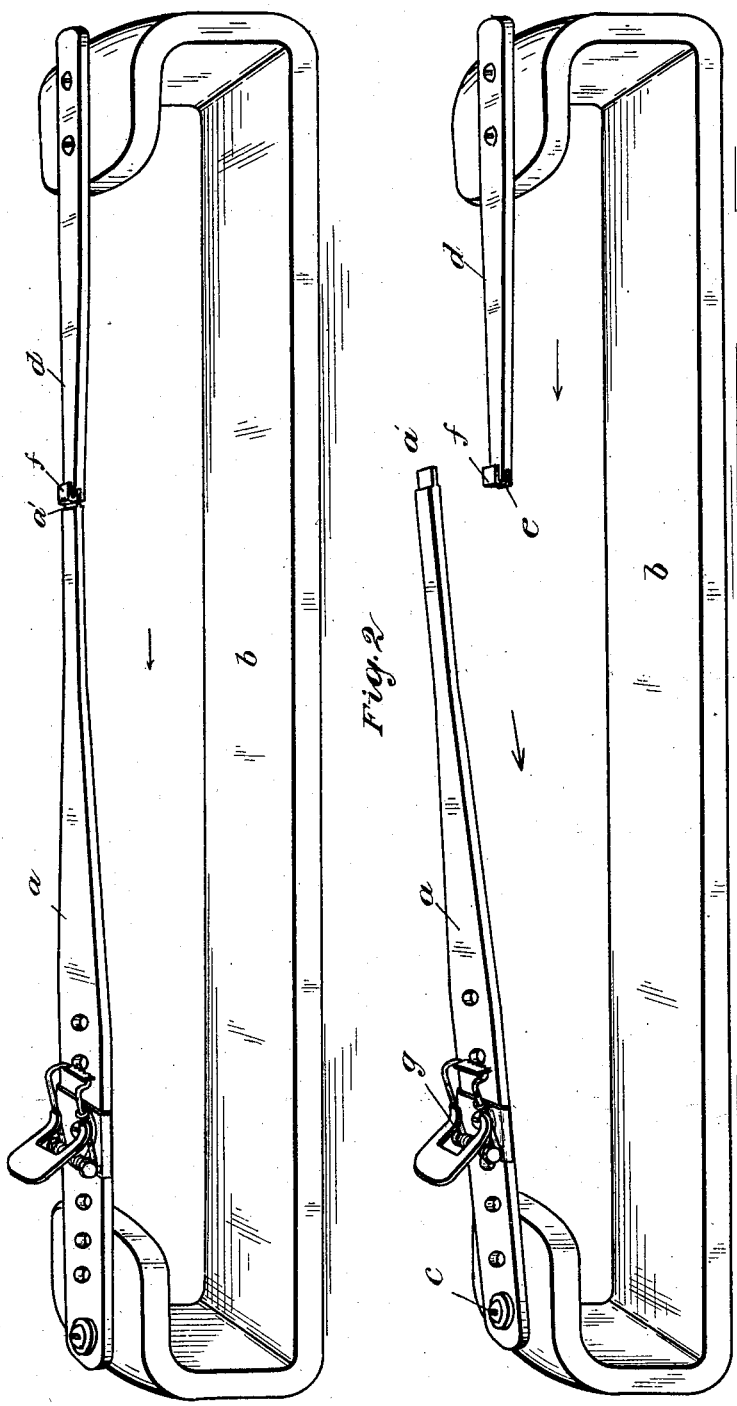

No. 754,597. Patented March 15, 1904.

UNITED STATES PATENT OFFICE.

WILLIAM NESBITT, OF TORONTO, CANADA.

CASING-TURNER.

SPECIFICATION forming part of Letters Patent No. 754,597, dated March 15, 1904.

Application filed April 20, 1903. Serial No. 153,400. (No model.)

*To all whom it may concern:*

Be it known that I, WILLIAM NESBITT, of the city of Toronto, in the county of York and Province of Ontario, Canada, have invented a certain new and useful Apparatus for Lining and Turning Hollow Casings, Such as Neckwear and Like Articles; and I hereby declare that the following is a full, clear, and exact description of the same.
In the manufacture of lined casings, such as neckwear and other goods of a similar character, it has been customary when making the hollow casings to turn the material inside out and sew the meeting edges together when in that condition in order that when the hollow casing is turned to bring the material face outward the seam or seams will be contained within the casing. After the casings have been sewed and turned the lining is inserted therein by placing the end of it in the end of the hollow casing and then forcing it through the casing by means of a lining-holder. One of the drawbacks to the use of this lining-holder has been its tendency to cut the material when being forced with the lining through the casing; but the most serious drawback has been the uneven and ruffled condition in which it left the lining in the casing and the loss of time required to smooth the lining out and work it into its proper position between the face and back of the casing, an operation usually requiring several minutes of time and adding unnecessarily to the cost of the finished product. The only other known method of inserting the lining into the casing has been to leave the casing in its inside-out condition after the seams have been sewed together and then inserting the lining-holder and lining a short distance into the casing, the casing being turned face outward as it is drawn over the lining-holder and lining. The same objections as above stated are also applicable to this method of using the lining-holder and inserting the lining into the hollow casing; and to obviate these objections is the object of the present invention, which is accomplished by employing a lining-holder of substantially the same size and shape as the lining and so arranging the lining-holder that it will securely hold the lining in a perfectly flat and unruffled condition while the casing is being drawn over it in order that the lining will lie in a perfectly flat unruffled condition between the face and back of the casing when the lining-holder has been withdrawn from the lined casing, as hereinafter more fully set forth, and more particularly pointed out in the claims.

In the drawings, Figure 1 is a perspective view of an apparatus for lining hollow casings, such as neckwear and other articles of a similar nature, in which the casing and lining vary in width from one end to the other, the lining-holders and casing-holders being separated to permit of the hollow casing being placed in position upon the casing-holder. Fig. 2 is a similar view to Fig. 1, showing the lining-holder closed against the casing-holder. Fig. 3 is a perspective view of an apparatus for lining hollow casings where the casing and lining are of the same width throughout their entire length. Fig. 4 is a longitudinal sectional view on the lines *a a* of Fig. 3.

Like letters of reference refer to like parts throughout the specifications and drawings.

The lining-holder *a* consists of a flat rigid bar of substantially the same dimensions as the linings and hollow casings with which it is intended to be used. One end of the lining-holder *a* is pivoted to one end of a substantially U-shaped frame *b* and is adapted to swing upon its pivot *c* to move the opposite end *a'* into and out of engagement with the casing-holder *d*, rigidly secured to the opposite end of the frame. The free end of the lining-holder *a* is fitted with a tongue *a'*, adapted to enter a corresponding groove *e* in the adjacent end of the casing-holder *d* in order that when the lining-holder is closed into the position shown in Fig. 2 it will form, with the casing-holder, a continuous bar from end to end of the frame *b*. The casing-holder *d* being rigidly secured to one end of the U-shaped frame *b* will support the free end of the lining-holder *a* and resist the downward strains caused by the weight of the linings and casings and the force necessary to turn the casing and draw it into position on the lining-holder. The end of the casing-holder *d* adjacent to the lining-holder *a* is fitted with a hook-shaped lug *f*, into which is inserted the adjacent end of the hollow casing preparatory to the casing being turned, and adjustably fitted on the lining-holder is a spring-clamp g to hold one end of the lining, the opposite end of the lining being placed around the tongue a' and held thereby when inserted into the groove e.

In the use of this apparatus the lining-holder is moved into the position shown in Fig. 1, and the hollow casing in an inside-out condition is placed upon the casing-holder d, and the lining is laid flat on the lining-holder, one end of the lining being held by the clamp g and the narrow end by the tongue a' when inserted in the groove. The lining-holder is then moved into the position shown in Fig. 2, and the remote end of the hollow casing is seized and drawn in the direction indicated by arrow in Figs. 1 and 2 until it extends beyond the end of the lining held by the clamp g, the hollow casing turning face outward as it is drawn over the lining, which remains throughout the operation in a perfectly flat and unruffled condition upon the lining-holder. When the maker is satisfied that the lining has been properly placed in position, the lining-holder is swung into the position shown in Fig. 1, and the clamp g is released to permit of the removal of the lined casing from the lining-holder.

In Figs. 3 and 4 the apparatus is shown to consist of a lining-holder h of the same width throughout its entire length, and a casing-holder i integrally formed with one end of the lining-holder h, such casing-holder i being arranged to be secured by any convenient means to a table, work-bench, or other stand. The casing-holder i contiguous to the lining-holder h is fitted with a hook-shaped lug j to engage the adjacent end of the hollow casing and hold it while the opposite end is being drawn forward over the lining. To hold the lining upon the lining-holder h, the lining-holder is provided with a removable plate k, corresponding in size and shape with itself and having a spring-tensioned catch l to engage the outer or free end of the lining-holder by which it is held in position. After the hollow casing has been placed on the casing-holder the lining is placed upon the lining-holder h, and the removable plate k is placed upon the lining, one end of the removable plate k entering a pocket h', formed in the lining-holder at its junction with the casing-holder, and the spring-tensioned catch l at the other end of the removable plate entering an aperture or keeper m in the outer or free end of the lining-holder to prevent the displacement of the removable plate while the casing is being drawn over it. The end of the hollow casing remote from the lining-holder is then drawn in the direction indicated by arrow in Fig. 3, turning face outward as it moves over the lining-holder. When the hollow casing has reached the end of the lining-holder and the lining is contained therein, the spring-catch l is disengaged from the keeper m, and the removable plate k is withdrawn from the lining-holder in order that the lined casing can be removed in the manner described in connection with the construction shown in Figs. 1 and 2.

I lay no stress on the shape of the lining-holder and casing-holder, nor on the specific means for holding the lining securely in position upon the lining-holder, nor on the means for engaging the hollow casing as it is being turned inside out, as it will be necessary for me to vary the shape of the lining-holder to correspond with the shape of the goods being manufactured, and I may be obliged for the same reason to vary the shape of the clamps for holding the lining in position on the lining-holder.

Having thus fully described my invention, what I claim as new, and desire to secure by Letters Patent, is—

1. In an apparatus for lining hollow casings, the combination of a lining-holder, a casing-holder and a catch for the casing-holder to engage one end of the casing as it is being turned.

2. In an apparatus for lining hollow casings, the combination of a lining-holder, a casing-holder, a catch for the casing-holder, to engage one end of the casing as it is being turned and means for holding the lining in position on the lining-holder.

3. In an apparatus for lining hollow casings, the combination of a supporting-frame, a casing-holder supported thereon having at its free end a tongue-receiving groove, a catch for the casing-holder to engage one end of the casing as it is being turned, and a lining-holder having at its free end a tongue to enter the groove of the casing-holder.

4. In an apparatus for lining hollow casings, the combination of a supporting-frame, a casing-holder supported thereby, having at its free end a tongue-receiving groove, a catch for the casing-holder to engage one end of the casing as it is being turned, a lining-holder pivotally supported by the supporting-frame having at its free end a tongue to enter the groove of the casing-holder and hold one end of the lining, and a clamp for the lining-holder to hold the other end.

5. In an apparatus for lining hollow casings, the combination of a supporting-frame, a casing-holder supported thereby, having at its free end a tongue-receiving groove, a catch for the casing-holder to engage one end of the casing as it is being turned, a lining-holder having at its free end a tongue to enter the groove of the casing-holder and hold one end of the lining, an adjustable clamp for the lining-holder to hold the other end and means for holding the clamp in its adjusted position.

Toronto, April 6, A. D. 1903.

WILLIAM NESBITT.

In presence of—
C. H. RICHES,
L. F. BROCK.